Jan. 5, 1926.  1,568,915
W. M. PARKES
ILLUMINATED LICENSE PLATE
Filed June 6, 1924
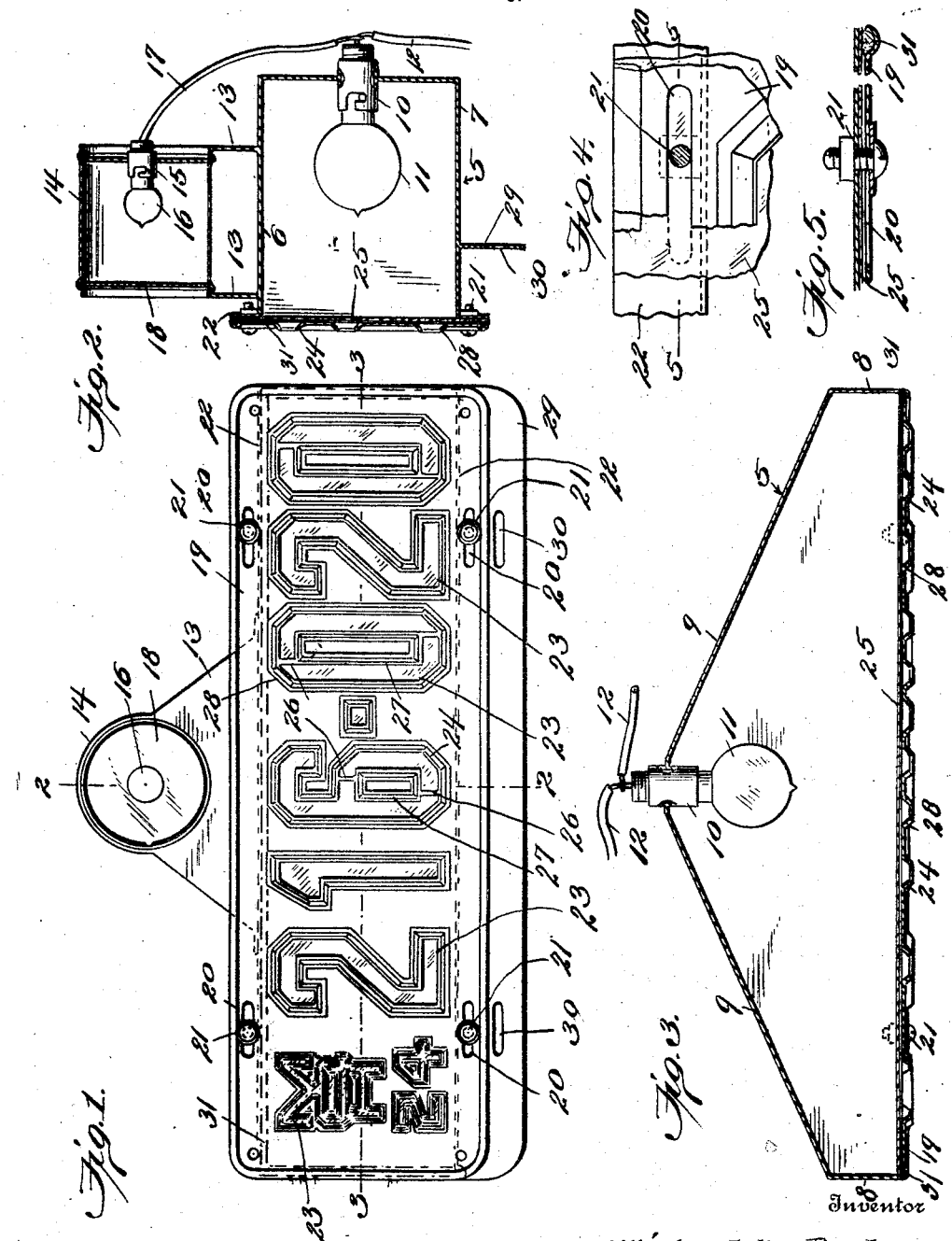
Inventor
Willard M. Parkes
By
Attorney Patented Jan. 5, 1926.

1,568,915

UNITED STATES PATENT OFFICE.

WILLARD M. PARKES, OF ONAWAY, MICHIGAN.

ILLUMINATED LICENSE PLATE.

Application filed June 6, 1924. Serial No. 718,338.

*To all whom it may concern:*

Be it known that I, WILLARD M. PARKES, a citizen of the United States, residing at Onaway, in the county of Presque Isle and State of Michigan, have invented new and useful Improvements in Illuminated License Plates, of which the following is a specification.

This invention relates to an illuminated license plate particularly adapted for use on automobiles and other analogous vehicles, and the primary object in view is to produce an article of the class specified in which the characters on the license plate will be more easily distinguished during daylight and which may be seen at several times the distance during darkness or at night, as compared with the ordinary illuminated license display devices of the present type now in common use.

A further object of the invention is to construct the parts of the device in such manner that they may be readily assembled and disconnected, to respectively facilitate the disposition of the coordinated parts and to substitute a new license plate when occasion demands, and furthermore, to provide for the application of the improved illuminated license plate to various makes of cars without changing the present form of license plate brackets, thereby making the improved device universal in its application.

A further object of the invention is to embody in a device of the class specified a two-light system which insures the glow of one light in case the other should burn out.

A further object of the invention is to so construct the enclosure for the lighting means and apply the license plate thereto as to prevent rattling and insure the provision of a strong and durable organization.

A still further object of the invention is to provide the license plate with flanges around and defining the several characters and formed by pressing out portions of the material around the openings, and to cover or apply distinguishing means to the struck-out flanges to harmonize or contrast with the body of the plate, so as to cause the struck-out flanges to act as reflectors and render the characters, such as letters and figures, readily readable and accurately discernible from various angles.

With these and other objects and advantages in view, the invention consists in the construction and arrangement of the several parts which will be more fully hereinafter described and claimed.

In the drawings:

Fig. 1 is a front elevation of an illuminated license plate embodying the features of the invention;

Fig. 2 is a transverse vertical section taken on the line 2—2, Fig. 1;

Fig. 3 is a horizontal section taken on the line 3—3, Fig. 1;

Fig. 4 is a detail view showing the manner of connecting the plate to the front of the illuminating closure or box; and Fig. 5 is a horizontal section taken on the line 5—5, Fig. 4.

The numeral 5 generally designates a casing, enclosure or box, including a flat top 6, a flat bottom 7 parallel with the top, two upright comparatively narrow ends 8 and a back wall made up of flat upright rearwardly converging members 9 having at the rear thereof a central socket 10 of ordinary form in which an electric lamp 11 is removably mounted, as usual, said socket being also provided with electrical connections 12. At the center of the top 6 and rising above the latter is a supplemental enclosure having front and rear upwardly converging supporting sides 13 for a cylindrical enclosure or casing 14, in the center of the rear wall of which is an electric light socket 15 having an electric light 16 removably mounted therein and also provided with electrical connections 17. The supplemental casing has a front glass or bull's-eye 18 of suitable color. On the front of the main casing, enclosure or box 5 a license plate 19 is secured through the medium of slots 20 at the upper and lower portions thereof engaged by headed bolts 21, nutted on the inside against upper and lower flanges 22, projecting upwardly respectively above and below the top 6 and bottom 7, as clearly shown by Fig. 2. The license plate 19 is preferably constructed of metal of suitable thickness, though other materials may be used. At regular intervals in the plate 9 openings 23 are formed in contours to respectively form license numbers and State and year abbreviations. In the present instance the license number is represented as being "216-020", the State abbreviation as "Mch" and the year abbreviation as "24". Each opening 23 is surrounded by an inwardly inclined out-pressed or out-struck flange 24, and in rear of and secured closely against the openings is a continuous sheet 25 of suitably colored non-breakable material, preferably mica, so as to render the license plate more durable and at the same time effect the transparent function desired. For the purpose of preserving the numerals or letters that may be used and to render them unmistakably distinguishable, such, for instance, as the numeral 6 and the ciphers, cross stays or connecting strips 26, which secure the central members 27 in fixed position relatively to and within the surrounding flanges 24, are disposed on opposite sides of the vertical central line or long axes of the said numeral and ciphers. In other words, the connecting strip 26 at the upper part of the bottom member of the numeral 6 is located at the right of the central vertical axis and the lower connecting strip 26 is disposed at the left of said axis. In the ciphers the connecting strips at the top and bottom may be either disposed at the left or right of the axes thereof, and by this means the numeral and cipher characters specified are not in the least obliterated and are made to accurately produce the representation of the characters intended. If these connecting strips were centrally located, or in line with the vertical axes of the numeral 6 and the ciphers, the ciphers would have the appearance, when viewed at an angle, of numerals other than intended, or the outline and general appearance of the numeral 6 and the ciphers would be confusing, and particularly would this be true in regard to the ciphers, each of which would present the appearance of the numeral 1 if the connecting strips were in line with the central vertical axes thereof.

Another very important feature is the application to the outer surface of the flanges 7 of a coating such as paint, to give the said flanges a reflecting function, and to facilitate this function and also render the numerals and letters more easily readable, a contrasting color or shade of material is applied around the bases of the numerals or letters on the body of the plate and closely following the outline of each numeral or letter, as at 28. This coating of paint or other material on the body of the plate at the bases of the flanges forms a very effective distinguishing marker, and it is proposed to use a color or shade of a decided contrast to that of the outer surface of the body of the plate. It has been found in many instances that by painting the flanges white and the distinguishing margin around the flanges of the same shade, or also white, the numerals or letters so treated may be accurately read from various angles. Moreover, this contrasting effect produces a license plate wherein the characters may be very easily read from a greater distance in daylight than is now possible with number plate characters as ordinarily constructed, and further, this advantageous effect also comes prominently into play when viewing the characters at night, particularly when the light is shining through the inner mica covering 25 of a contrasting color, which it is preferred should be different from that of the flanges and distinguishing margin around the characters or numerals and on the outer surface of the body of the plate.

Depending from the flat bottom 7 of the casing, enclosure or box 5 at a distance from the front terminal of said bottom is a depending attaching flange 29 having slots 30 therein to receive securing bolts or license plate brackets now in use, the flange 29 being so disposed that the improved illuminated license plate may be readily attached to brackets now in use, thereby rendering the improved device universal in its application.

The operation of the improved illuminated license plate is very simple. During daylight the electric lights 11 and 16 are extinguished but at night they are caused to glow by actuating a suitable switch means and the light shows through the colored mica plate 25 and the openings 23, and the rays of light from the upper electric light 16 are projected through the front glass or bull's-eye 18. The upper light may serve as a tail light, and by having the two illuminated organizations in assembled relation as specified, a two-light system is provided which insures a continuous glow of one light when the current is supplied thereto in case one of the lights should burn out. The number plate constructed as specified may be changed from time to time as may be required, or replaced by a substitute plate that may bear different license numbers or characters. Among other advantages of the improved illuminated license plate is that the numerals or characters thereon are always discernible regardless of the accumulation of dust or other material collected during travel, this advantage being due to the outwardly pressed inclined flanges around the numbers, letters or characters.

By having the light 11 located centrally with relation to the rearwardly converged wall members 9, material economy results in the use of lighting means and current, as one lighting device will be as effective as a plurality of such devices, in view of the fact that the front surfaces of the side walls throw the rays of light towards and through the openings 23 and through the colored mica 25 and openings 23 of the plate 19, and, if desired, the front surfaces of the members 9 may be provided with a reflecting covering to further augment the desirable action of the reflected light rays.

As shown by dotted lines in Fig. 1 and in section by Figs. 2, 3 and 5, a gasket 31 of felt or other suitable material is interposed between the license plate 19 and the top and side edge portions of the sheet 25 of non-breakable material or mica, to act as a buffer or prevent injury to the said transparent sheet due to vibration or shock. The gasket is open at the bottom or does not extend across the inner lower edge portion of the license plate, so that dust that may pass in through the openings 23 may be readily liberated at the lower portion of the license plate or between the latter and the lower flange and the front of the casing, enclosure or box.

What is claimed as new is:

1. The combination with an enclosure having lighting means therein, of a license plate secured thereover and provided with a series of openings defining characters, the openings having outstruck, inwardly beveled marginal walls, and a colored material held against the plate in rear of the said openings, the face of the plate having a distinguishing color applied directly thereto and the outwardly struck, inwardly beveled flanges also having a coloring matter applied directly thereto and positively distinguishable from the coloring of the face of the plate, the face of the plate at the bases of the flanges also having coloring matter applied around the flanges and of the same contour as the latter to set out the characters defined by the openings and flanges in contradistinction to the coloring of the face of the plate.

2. The combination with an enclosure having lighting means therein, of a license plate secured over the front of the enclosure and provided with a series of openings defining various characters, the openings being surrounded by similarly shaped outwardly struck and inwardly beveled flanges, the license plate having coloring matter directly applied fully over the outer face thereof and the flanges having a distinguishing coloring matter applied directly on the outer sides of the same, a stripe of coloring matter distinguished from the coloring matter of the face of the plate being also applied on the plate at the base of and regularly following the contour of the flanges and character openings, the flanges in part having cross connecting means from the inner to the outer portions thereof.

In testimony whereof I have hereunto set my hand.

WILLARD M. PARKES.